United States Patent [19]

Inculet et al.

[11] Patent Number: 4,960,524
[45] Date of Patent: Oct. 2, 1990

[54] METHOD FOR SOIL CONSOLIDATION

[76] Inventors: Ion I. Inculet, 81 Lloyd Manor Crescent, London, Ontario, Canada, N6H 3Z4; Kwan Y. Lo, 482 Village Green Avenue, London, Ontario, Canada, N6J 1Z3

[21] Appl. No.: 182,660

[22] Filed: Apr. 18, 1988

[51] Int. Cl.⁵ .............................. C02F 1/46; C25B 7/00
[52] U.S. Cl. .................................... 210/747; 210/748; 204/149; 204/183.1
[58] Field of Search ...................... 210/747, 748, 243; 204/149, 180.1, 182.2, 183.1, 186

[56] References Cited

U.S. PATENT DOCUMENTS

| | | | |
|---|---|---|---|
| 3,336,220 | 8/1967 | Neidl | 210/14 |
| 3,687,834 | 3/1972 | Candor | 204/183.1 X |
| 3,915,826 | 10/1975 | Franceschini | 204/18.2 |
| 4,169,029 | 9/1979 | Smirnov et al. | 204/183.1 X |
| 4,283,290 | 8/1981 | Davies | 210/748 X |
| 4,290,882 | 9/1981 | Dempsey | 210/748 X |
| 4,501,648 | 2/1985 | Ritter | 210/748 X |
| 4,601,834 | 7/1986 | Bailes et al. | 210/748 |
| 4,670,118 | 6/1987 | Klinkowski | 210/748 X |
| 4,678,554 | 7/1987 | Oppitz | 210/748 X |
| 4,755,305 | 7/1988 | Fremont et al. | 210/748 |
| 4,767,514 | 8/1988 | Candor | 204/183.1 |

*Primary Examiner*—Tom Wyse
*Attorney, Agent, or Firm*—Nixon & Vanderhye

[57] ABSTRACT

A method and apparatus for separating liquid for material of differing permativity is disclosed. The method involves the application of an AC voltage to a material to create an a non-uniform electric field of the same frequency as the applied AC voltage which decreases in strength the further the radial distance from the point of application to induce flow of the liquid in the material. Collection means are located in the path of induced flow to collect the liquid. The apparatus of the invention consists of a means of generating an AC voltage, a terminal in contact with material and connected to the means of generating the voltage so as to receive the material and impart a non-uniform electric field to the material. Means for collecting the liquid that collects at a region in which the liquid is concentrated is also provided.

8 Claims, 4 Drawing Sheets

METHOD FOR SOIL CONSOLIDATION

This invention relates the separation of liquid from particulate material, and more particularly to the removal of liquid from particulate material by applying an electric field. It is desirable to remove liquid from particulate material in many different industries. Water is removed from peat moss to improve its absorptive characteristics, from mine tailing and sewage so that the solids can be treated, and from soft soils to improve the strength of the soil.

The application of this invention to soft to firm soil will be discussed in detail, although it is to be appreciated that this invention can be used with other types of particulate materials.

To obtain a stable support for roads, buildings and other types of construction, it is often necessary first to increase the shear strength of the base soil. It is a well known fact in soil mechanics that there is an inverse relationship between shear strength and moisture content of the soil. Therefore, to achieve a greater degree of consolidation and to increase the shear strength of a specific soil sample, water that is physically bound to the soil must be removed.

The only prior art process known to the applicants that involves the application of electricity to increase the shear strength of soils is electro-osmosis. In this process a high DC current (about 200 amps) under a voltage of about 50 volts is applied between two electrodes for a period of several months to consolidate the soil. The application of electricity by this method induces negative pore pressures which cause water to flow from one electrode to the other. The water is then removed by pumping or by collecting it in a drainage ditch. Details of this method can be found in the following references: Bjerrum. L., Moum, J., and Eide, 0. (1967) "Application of Electro-Osmosis to a Foundation Problem in a Norwegian Quick Clay" *Geotechnique*, Vol. XVII, September, 1967, pp. 214–235; Casagrande, L. (1935) "Method of Hardening Soils," U.S. Pat. No. 2,099,238, 1937 (application filed, Jan. 7, 1935); and Wan, T. Y. and Mitchell, J. K. (1976) "Electro-osmotic Consolidation of Soils," *Journal of the Geotechnical Engineering Division*, ASCE, Vol. 102 No. GT5, May 1976, pp. 473–491.

Although electro-osmosis is an effective method of consolidating soils, the high currents that must be used result in high energy consumption which may render this method of soil consolidation economically impractical. Also, the use of high currents is potentially hazardous to human safety.

It is therefore an object of the present invention to obviate or mitigate the above mentioned disadvantages.

Accordingly, the invention provides a method of separating liquid from material of differing permittivity comprising the steps of: applying an AC voltage to said material to create a non-uniform electric field of the same frequency as the applied AC voltage which decreases in strength the further the radial distance from the point of application, to induce flow of liquid in the material; and locating collection means in the path of induced flow to collect said liquid.

The invention further provides an apparatus for removing liquid from material of differing relative permittivities comprising:

means of generating an AC voltage;

a terminal in contact with said material and connected to said means of generating said voltage so as to receive said voltage and impart a non-uniform electric field to said material; and means of collecting the liquid that collects at a region in which the liquid is concentrated, whereby application of said field to said material induces flow of liquid towards said collector means.

Embodiments of the invention will now be described by way of example only with reference to the following drawings in which.

Figure 1:
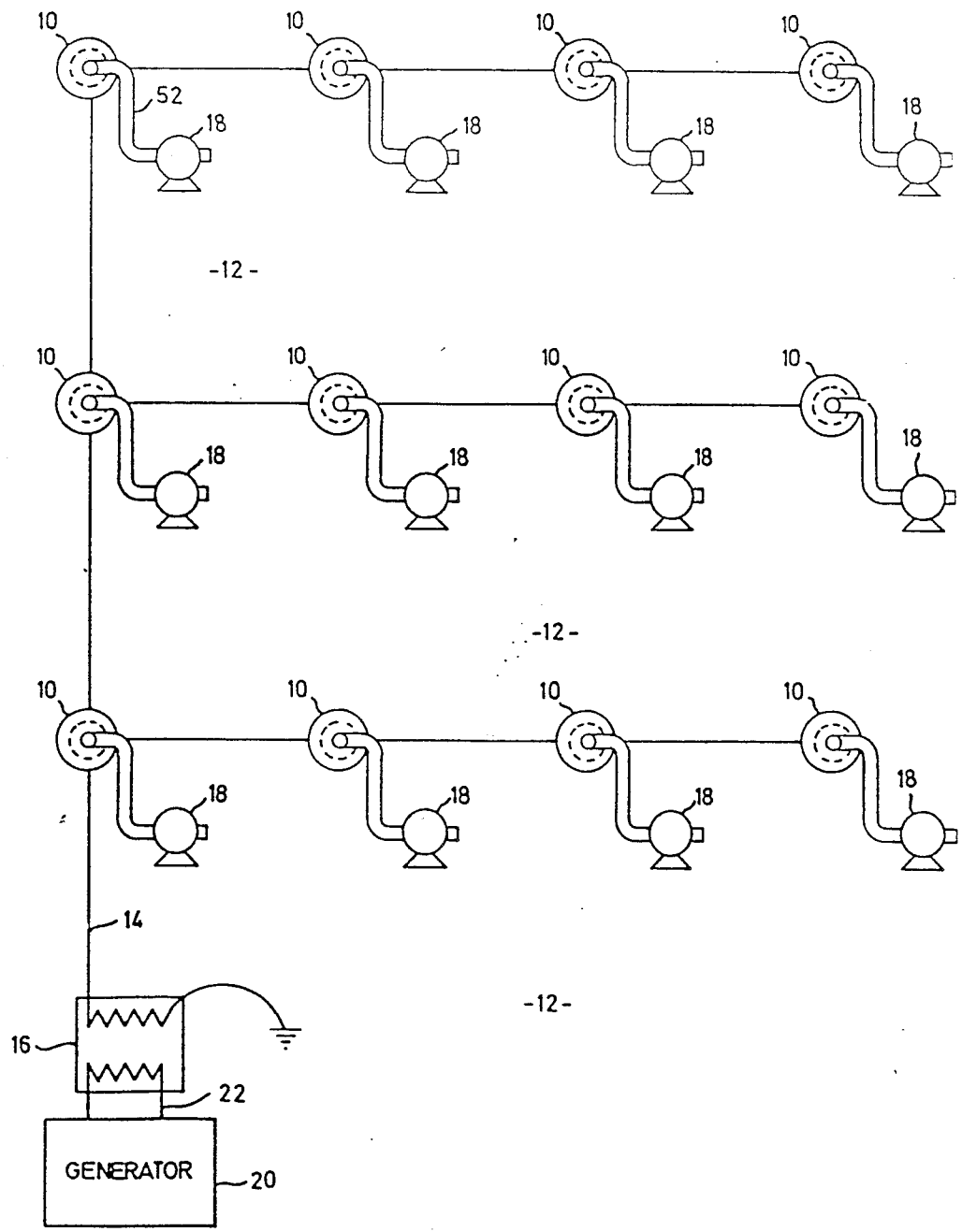
FIG. 1 is a schematic view of a water extraction system.

As seen in FIG. 1, a preferred embodiment of the invention consists of several electrode assemblies 10 arranged in a grid and embedded in the soil 12. The assemblies 10 are electrically connected in parallel by a common conductor 14 to one terminal of a transformer 16. The other terminal of transformer 16 is grounded so that a potential difference is imposed between the assemblies 10 and the soil 12. One or more pumps 18 may be associated with electrode assemblies 10 to remove the water that collects in the vicinity thereof. A generator 20 supplies voltage to the transformer through a connection 22.

Figures 2, 3:
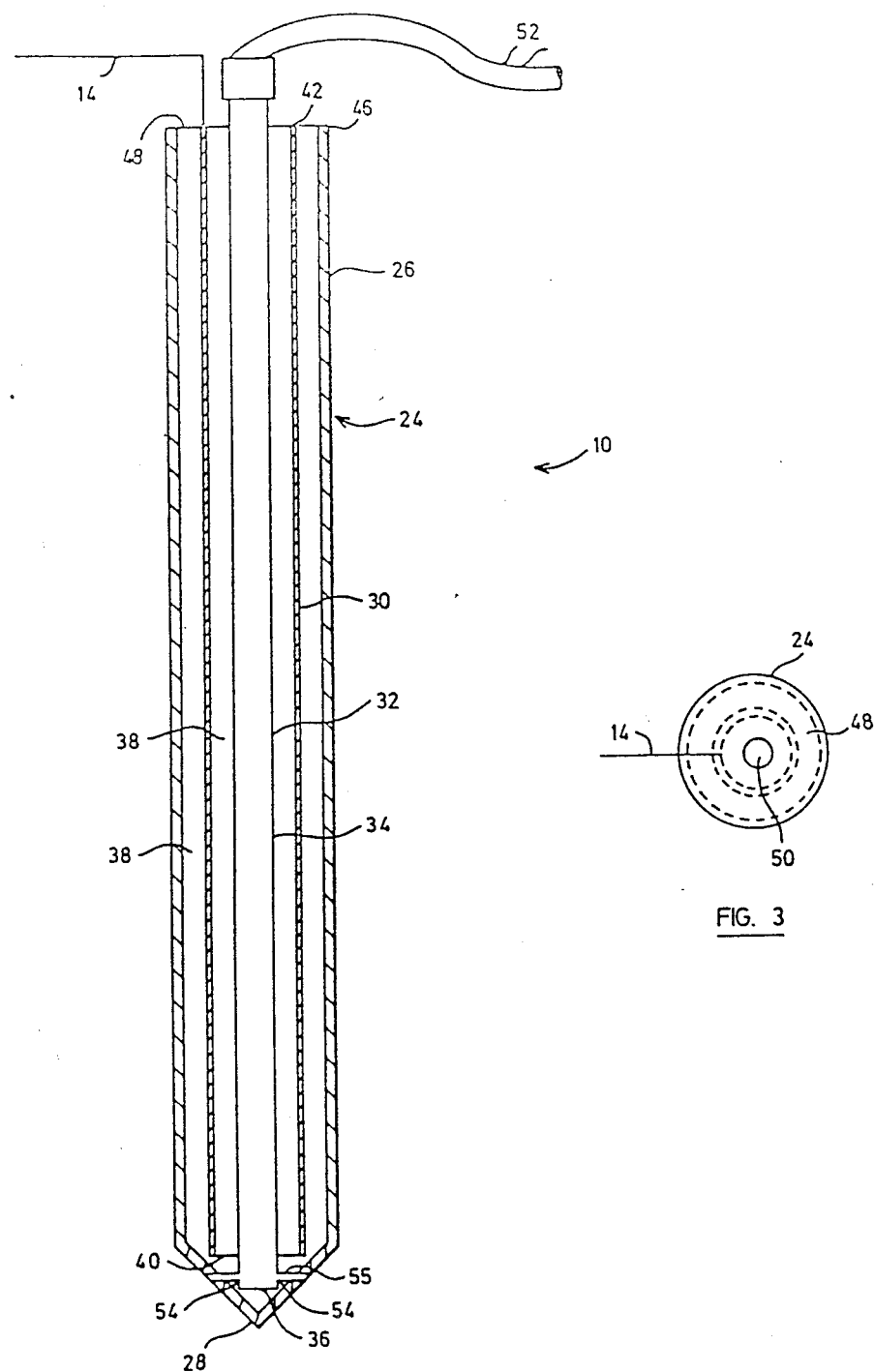
FIG. 2 shows a side cross-sectional view of an electrode to be used in the water extraction system of FIG. 1.
FIG. 3 shows a plan view of the electrode of FIG. 2.

A preferred embodiment of the electrode assembly 10 car be seen in FIGS. 2 and 3. An outer housing 24 which has a tubular main body 26 and a conical bottom 28 provides structural support for and protects the inner elements of the electrode assembly 10. A tubular electrode 30 sits inside the housing such that it is concentric with and spaced from the tubular main body 26, and a water container 32, which is constituted by an open ended cylinder with a side wall 34 and end wall 36, sits inside the electrode 30 such that it is concentric with and spaced from the electrode. The electrode 30 is supported within the housing 24 by insulating material, such as mylar, 38 located on opposite sides of the housing with an insulated disc 40 interposed between the electrode 30 and the conical bottom 28 of the housing 24. The container 32 rests on the inner side walls of the conical bottom 28 of the housing 24, and top edge 42 of the electrode 30 is flush with the top edge 46 of the housing 24. A second insulated disk 48, which has an aperture 50 in its center that corresponds to the opening in the container 32, is attached to the top edge 46 of the housing 24 such that it covers and seals the opening between the housing 24 and the container 32 to prevent water from flowing into the area in which the electrode 30 resides. Side wall 34 of container 32 projects through the aperture 50 in disc 48 and is attached to a suction line 52 of pump 18.

At its top end, the electrode has a conductor 14 which passes through the disk 48 and connects the electrode 30 to a terminal on the transformer 16 (see FIG. 1).

The housing 24 is made of a non-conductive, corrosion resistant, rigid material, such as high density polyethylene. An alternate embodiment could comprise a conductive housing 24 such as steel to facilitate the insertion of the electrode assembly into the soil.

The container 32 is also made of corrosion resistant, rigid material and has inlet ports 54 near its bottom end to which are connected outlet tubes 55 that pass through openings in the wall of the housing 24.

The electrode assembly is typically about 15-20' long although it can be made shorter or longer to meet the requirements of the application.

Figure 4:
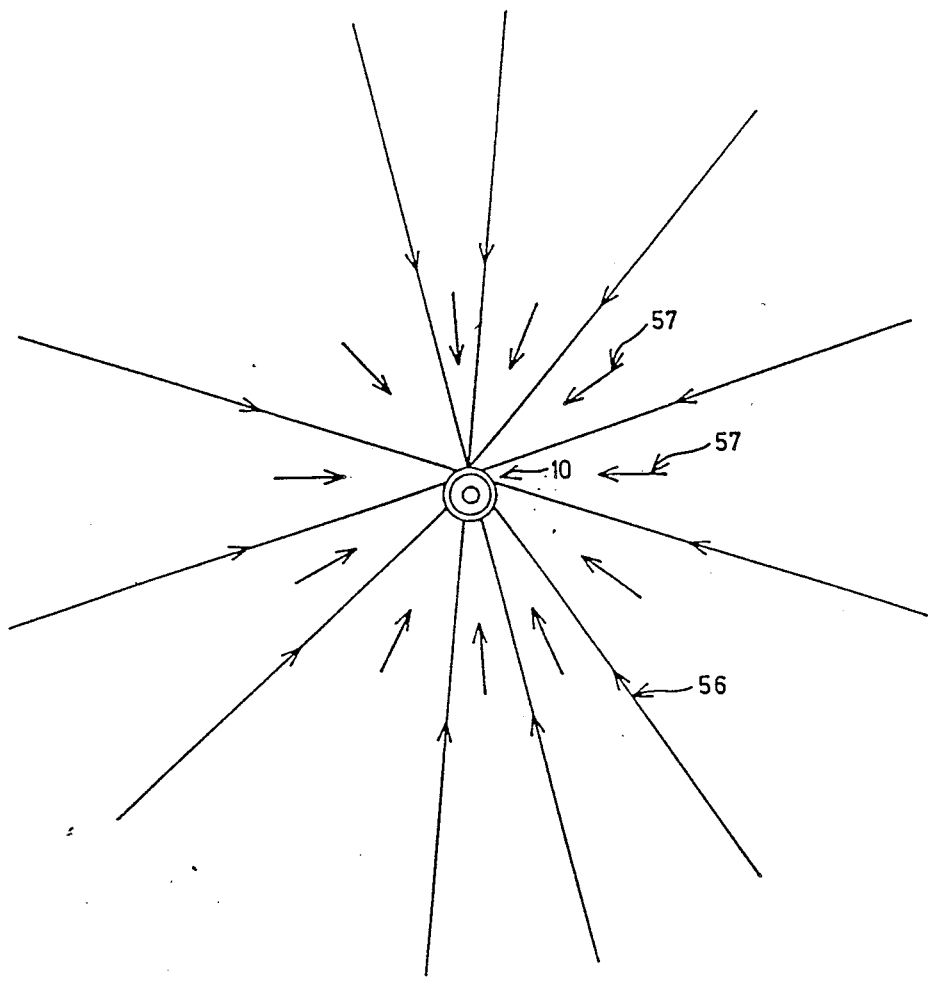
FIG. 4 is a schematic plan view of the system in FIG. 1 showing the electric field lines and the water flow direction.

The operation of the apparatus of the invention will now be described with reference to FIGS. 1 and 4. The electrode assembly 10 is first embedded in the soil 12. The associated suction line 52 and pump 18 are then attached to the container 32, and the transformer 16 is attached to the electrode by conductor 14. The transformer 16 applies an AC voltage in the order of 1 to 100 kilovolts at a frequency of 25, 50 or 60 Hz to the electrode and creates an electric field in the soil with a resulting very low AC current. From FIG. 4, it can be seen that the electric field, as indicated schematically by the electric field lines 56, converges at the electrode assembly. Thus, the field is strongest near the electrode and becomes weaker the further the radial distance from the electrode. This field is of the same frequency as the AC voltage applied to the soil. Once the field is created, the water physically bound by the soil starts to flow in the direction of increasing electric field strength, i.e. in the direction of the electrode assembly 10 as indicated schematically by water flow lines 57. The water enters inlet ports 54 and is pumped out the top opening of the water container 32 by the associated pump 18.

The flow of the water in the direction of increasing field strength is believed to be caused by a phenomenon known as dielectrophoresis. Any particle, solid or liquid, will move in the direction of increasing electric field strength if its permittivity is greater than the permittivity of the medium and conversely will move in the direction of decreasing electric field strength if the permittivity is less than the permittivity of the medium. As the permittivity of clay soils is about 6 and the permittivity of water is about 80, the water particles move in the direction of increasing electric field. The dielectrophoretic forces which move the water are proportional to the magnitude of the electric field intensity squared.

Figure 5:
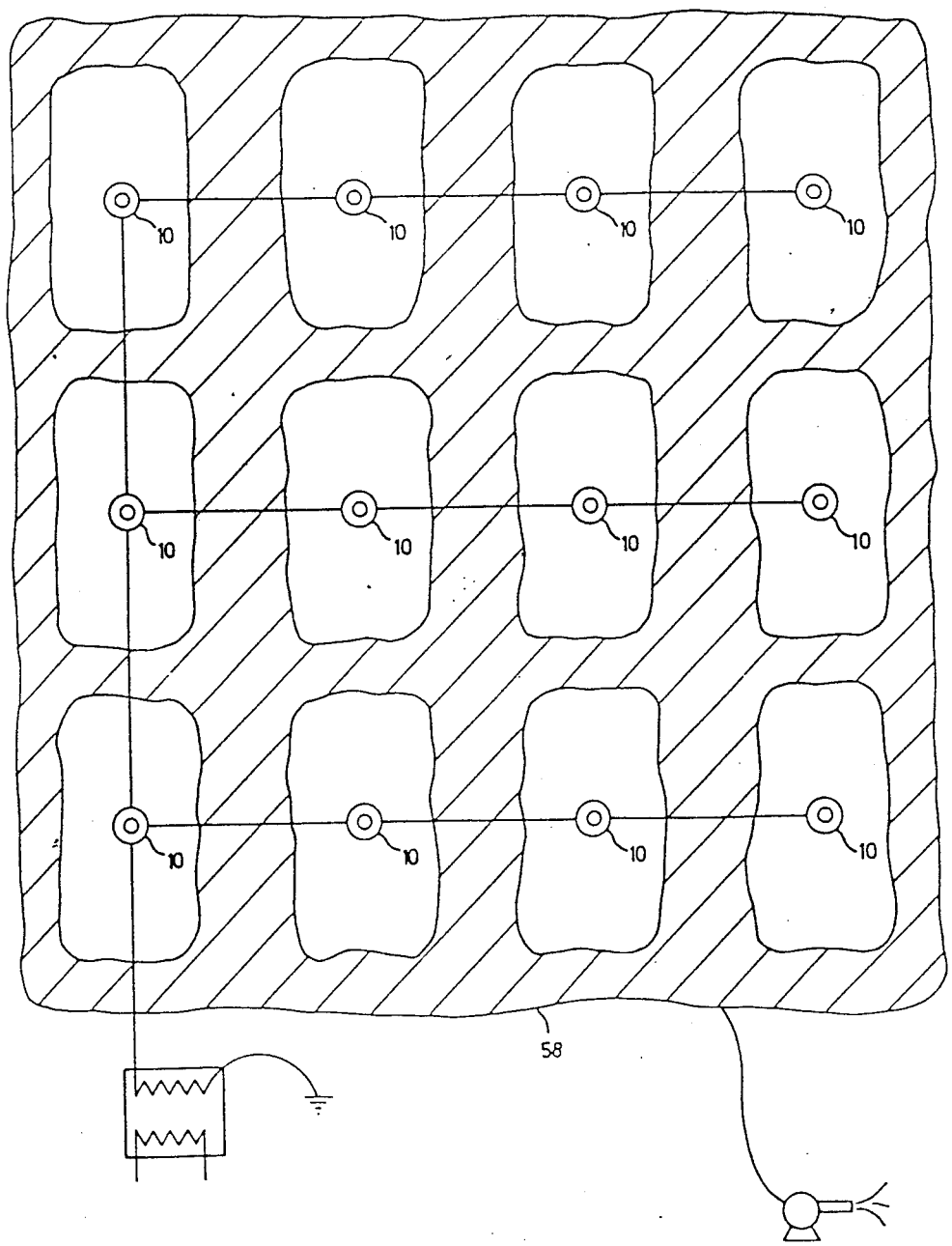
FIG. 5 shows an alternate water extraction system.

The results of a test done on an undisturbed sample of soft clay are given here to illustrate the effectiveness of this method of water separation. The sample was 6 inches in diameter, and 5 inches high with a cylindrical hole of 1 ⅛ of an inch in diameter in which the electrode assembly was placed. An average voltage of 17.5 kilovolts was applied for 5 days. The water content and shear strength were determined before and after the test. Water expelled from the soil was collected and measured. It was found that the water content of this sample decreased from 34% to 29% with a shear strength increase from 580 to 2200 psf. It has, therefore, been demonstrated that the soil has been strengthened by a factor of 3.8, or 280% increase in strength. It will be appreciated that modifications can be made to the apparatus for removing water from particulate material within the scope of the invention as described and claimed. For instance, the means of applying an AC voltage to the soil could be a bar-shaped electrode or an insulated wire instead of tubular electrode and the voltage could be generated from a direct power source rather than through a transformer. Also, water could be collected in a container that surrounds the electrode, or a container may not be used at all and drainage ditches could be dug to direct the flow of water towards a nearby body of water. It will also be appreciated that if the permittivity of the liquid is less than the permittivity of the medium, the fluid will move in the direction of decreasing electric field. For example in oil fields or oil sand deposits, the oil particles have a permittivity significantly less than that of the medium (the sand). The apparatus of FIG. 1 can be adapted to remove the liquid in this case by collecting the liquid in the areas of lowest electric field intensity and highest liquid concentration as indicated by the numeral 58 in FIG. 5.

This invention can be used to consolidate soft to firm clays, silts or organic soils. The shear strength of these soils before the removal of water ranges from 0-2000 psf approximately. It can also be used to extract liquid that is physically bound by other types of particulate material, such as sewage, mine tailings or peat moss, if the permittivity of the liquid and the permittivity of the particulate material differ.

We claim:

1. A method of separating liquid from particulate material by dielectrophoresis, said material being selected from the group comprising clays, silts, organic soils, peat moss, mine tailings, sewage and oil sands of a differing permittivity to which it is physically bound, said method comprising the steps of:
    applying an AC voltage in the range of 1 to 100 kilo volts and at a frequency in the range of 0.01 to 100 Hz to an electrode electrically insulated from said material to create a non-uniform electric field of the same frequency as the applied AC voltage which decreases in strength the further the radial distance from the point of application, to induce flow of the liquid in the material; and
    locating collection means in the path of induced flow to collect said liquid.

2. A method as claimed in claim 1 comprising the further step of removing the liquid from said collector means.

3. A method as claimed in claim 2 wherein the liquid is removed by pumping.

4. A method as claimed in claim 1 wherein said AC voltage is applied by an electrode connected to an AC voltage source.

5. A method as claimed in claim 1 wherein the frequency is selected from one of the standard world frequencies for transmission of electrical power, specifically 25, 50 and 60 Hz.

6. A method as claimed in claim 1 wherein the particulate material is selected from clays, silts and organic soils and the shear strength of said particulate material before the removal of water ranges from 0 to 2000 psf.

7. A method as claimed in claim 1 wherein said electric field is applied in situ to consolidate said material.

8. A method for consolidating soils in situ by dielectrophoresis, said material comprising the steps of:
    connecting an AC voltage source and water removal means to a plurality of electrode assemblies;
    embedding electrode assemblies into the soil; applying an AC voltage of between 1 to 100 kV and a frequency of between 0.01 to 100 Hz to an electrode insulated from said material; and
    removing the water which collects at the electrode assembly.

* * * * *